Figure 1:
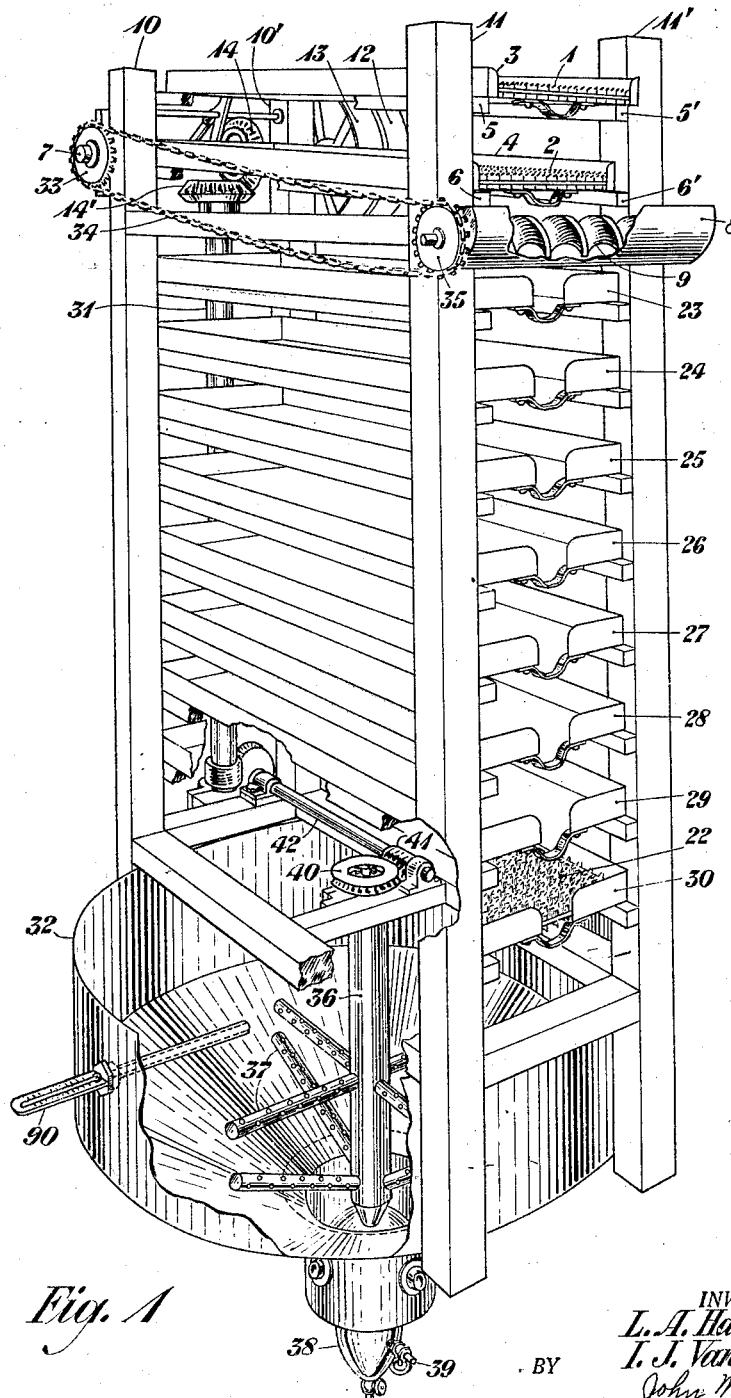

Feb. 24, 1925.                                                                    1,527,404
                        L. A. HALLER ET AL
                     SIFTING AND MIXING MACHINE
                      Filed Feb. 13, 1920         3 Sheets-Sheet 2
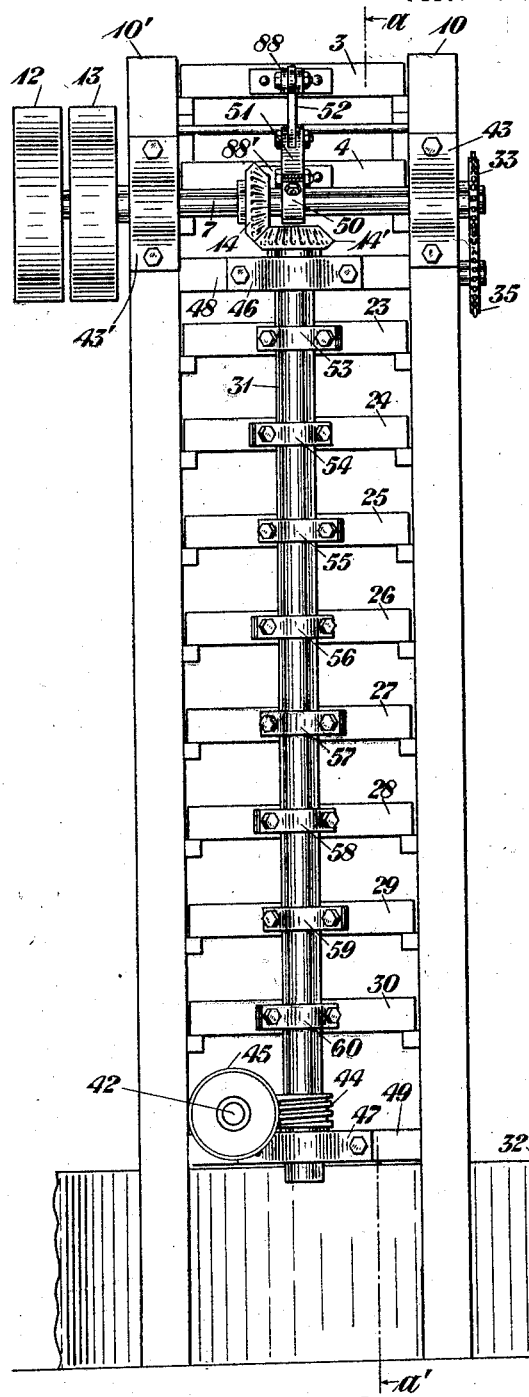
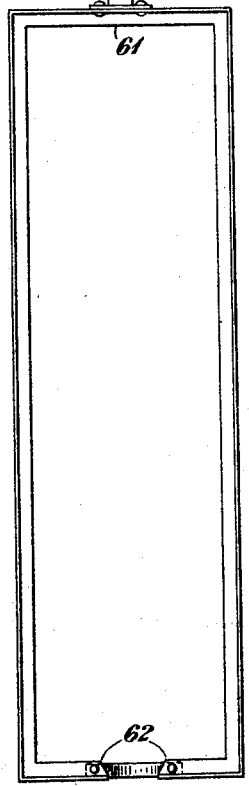
Fig. 2
Fig. 3
Fig. 3a
INVENTORS
L. A. Haller and
I. J. Van Fossen
BY
John M. Done
ATTORNEY Feb. 24, 1925.
L. A. HALLER ET AL
SIFTING AND MIXING MACHINE
Filed Feb. 13, 1920
1,527,404
3 Sheets-Sheet 3
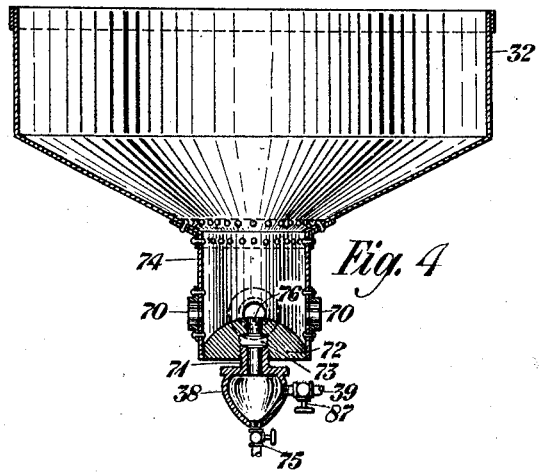
Fig. 4
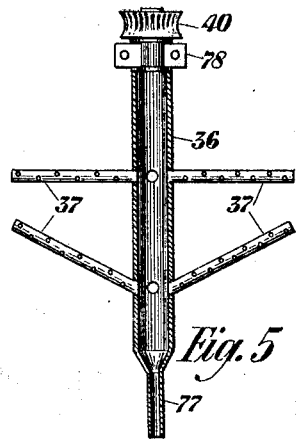
Fig. 5
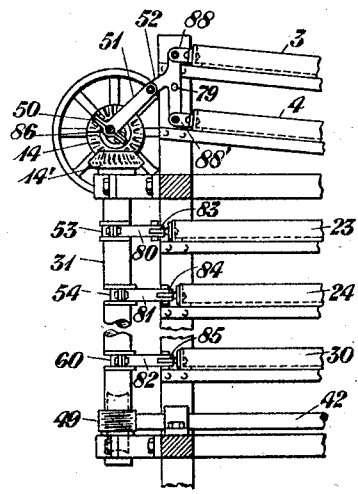
Fig. 6
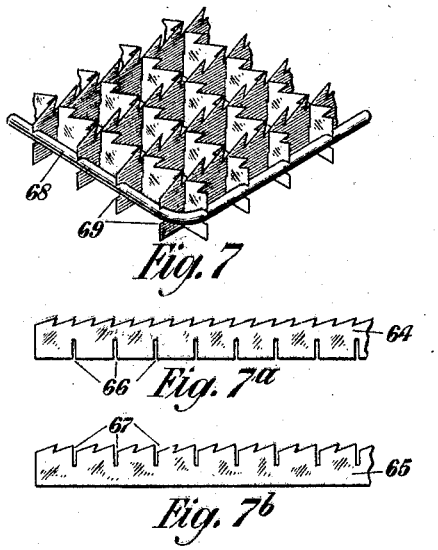
Fig. 7
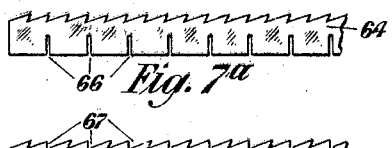
Fig. 7ᵃ
Fig. 7ᵇ
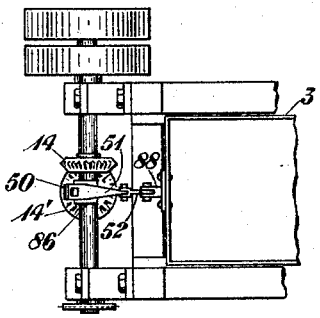
Fig. 6ᵃ
INVENTORS
L. A. Haller and
I. J. Van Fossen
BY
John McGlone
ATTORNEY Patented Feb. 24, 1925.

1,527,404

UNITED STATES PATENT OFFICE.

LUCIUS A. HALLER AND IVEN J. VAN FOSSEN, OF WESTMINSTER, MARYLAND.

SIFTING AND MIXING MACHINE.

Application filed February 13, 1920. Serial No. 358,539.

*To all whom it may concern:*

Be it known that we, LUCIUS A. HALLER and IVEN J. VAN FOSSEN, residing at Westminster, in the county of Carroll and State of Maryland, respectively, have invented certain Improvements in Sifting and Mixing Machines, of which the following is a specification.

This invention relates to sifting and mixing machines and more particularly to machines of that type which are designed primarily for silking, cleaning and mixing green corn preparatory to preserving it in hermetically sealed containers.

In preparing green corn for the cooking and sealing operations, a necessary step consists in removing all silk which remains after the husking operation has been completed, and also all other objectionable foreign matter such as ribbon husks, broken cobs, buttstrips, etc., which unavoidably mixes with the corn during the preliminary operation of cutting and scraping the kernels from the cob. The presence of such foreign matter in the final product affects greatly its salability and therefore it is of prime importance to remove substantially all such matter from the green corn prior to beginning the cooking of it. This invention provides a simple and efficient mechanism for the reception of uncleaned corn, as cut from the cob, adapted to treat it in such manner as to free it from substantially all foreign matter and to thoroughly mix it for the subsequent operations of cooking and packing.

Machines heretofore designed and constructed for the removal of silk and other objectionable matter have proven very inefficient in operation. In a machine of such type it is now necessary to stop its operation whenever one of the screens becomes clogged with silk, in order to remove the screen for cleaning and to restore it again to its proper place. Such stoppage affects, of course, the efficiency of operation of the entire process. If the cleaning of the clogged screen is unduly delayed, an excessive amount of good corn will consequently be held in the collected mass of silk and will be lost in the operation of cleaning the screen.

One of the objects of this invention is to provide a screen not only designed to be highly efficient in removing silk and other objectionable matter from the green corn but also adapted to be readily and quickly removed from the machine for cleaning and to be restored thereto without stopping the operation of the machine.

Another object of this invention is to effect the removal of the larger pieces of foreign matter, such as bits of cobs, buttstrips, etc., in a more efficient manner than has been employed in machines hitherto used. In the latter machines, the cob-separating device consisted of a circular or rectangular rotating sieve which has proved to be unsatisfactory because of its limited capacity, lack of compactness, expense, and difficulty in cleaning. In our invention these difficulties are overcome by the use of one or more flat screens, each having a relatively rapid reciprocating motion, and slightly inclined toward one end of the machine so that the large particles will gravitate to that end and drop into a trough containing a worm by means of which the material will be conveyed away.

Another object of this invention consists in the provision of a mixing receptacle or mixer which cooperates with the screening device to receive the kernels of green corn from which all silk and other extraneous matter has been removed and to prepare said corn for the subsequent cooking and packing processes.

Other and further objects of this invention will be apparent from the following description when read in connection with the attached drawing of which Figure 1 shows in perspective a view of the complete machine, Figure 2 shows an end view of the machine, Figures 3 and 3ª show views of a frame for supporting the screen, Figures 4 and 5 show respectively a cross-section of the mixer and of the shaft of the mixer, Figures 6 and 6ª show the upper horizontal and the vertical crank-shafts of the machine together with the details of the arrangement for connecting the cranks to the frames, and Figures 7, 7ª and 7ᵇ show details of the screens.

Figure 1 shows one form of the complete machine comprising a plurality of sieves supported by a suitable framework adapted to rest upon the floor and having a hopper suitably placed beneath the lowest of the said screens, to collect and mix the corn falling therein. In this figure, 1 and 2 represent two screens supported in inclined position by the frames 3 and 4 respectively which rest upon the guides 5 and 5', 6 and 6' respectively, the guides 5 and 6 being shown partly broken away in order that certain details of the machine may be disclosed in this figure. These frames are connected with the upper horizontal shaft 7, in a manner which will later be described more fully, by means of which the frames are given a rapid reciprocating motion in relatively opposite directions. Only two inclined sieves are shown in the drawing since they suffice to illustrate the invention, but it is to be understood that the number may be varied, depending upon the nature of the material to be screened. Situated below the lower ends of the inclined screens and adapted to receive any material dropped therefrom is a trough 8, which is shown broken away in part in order to disclose therein the worm 9 by means of which coarse refuse material may be carried away.

The upper horizontal shaft 7, supported by suitable bearings attached to two of the upright posts 10 and 10' of the machine framework, has connected therewith an idle pulley 12 and a driving pulley 13 by means of which the operating power is applied to the machine. Power is transmitted to the vertical crank-shaft 31 by means of the pair of bevel gears 14 and 14'. Also attached to the upper shaft is a sprocket wheel 33 which cooperates by means of a chain 34 with another sprocket wheel 35 attached to the shaft of the worm 9, so as to operate the worm.

Arranged below the inclined screens 1 and 2, is a plurality of screens of a type represented by 22, and, in general, similar to 1 and 2, which are supported in frames 23, 24, 25, 26, 27, 28, 29 and 30, respectively, which are supported in a substantially horizontal position by the guides similar to 5 and 5' attached to the upright posts 10 and 10', 11 and 11' of the framework of the machine. The frames 23, 24, etc., are connected with a vertical crank-shaft 31, by means of which the frames are given a rapid reciprocating motion, and in order to eliminate excessive vibration the motion of the adjacent frames is in relatively opposite directions. The manner of connecting the horizontal frames to the shaft will be later described more fully. It is to be understood, of course, that the number of horizontal frames is not limited to eight but may be greater or less, depending upon the requirements of each specific case. The lowest frame 30, together with its screen 22 and certain cross braces of the machine framework are shown partly broken away in order to bring out more clearly details of the driving mechanism.

Suitably arranged below the horizontal screens is a receptacle or hopper 32 which is adapted to receive the kernels of cleaned corn which fall from the lowest screen 22, and to prepare the corn thus held for the cooking process. Centrally located within the hopper 32 is a hollow vertical shaft 36 having a plurality of hollow, perforated arms 37 which when the said shaft is rotated are adapted to sweep through the mass of corn that has collected in the hopper, thus causing it to be thoroughly mixed. The lower end of the vertical shaft 36 which is open, extends into the bowl 38 connected with a source of live steam 39. The upper end of shaft 36 is closed to prevent the egress of steam, and has connected therewith a gear 40 which meshes with the worm 41 of the lower horizontal shaft 42. Steam from the bowl 38 will flow into the hollow shaft 36 and the arms 37 and will be ejected from the perforated arms into the mass of corn, thus preparing it for the subsequent cooking operation.

Figure 2 shows more clearly the driving end of the machine. The upper horizontal shaft 7, supported by the bearings 43 and 43' attached to the upright posts 10 and 10' respectively. The vertical crank-shaft 31 is supported at the top and bottom by the bearings 46 and 47, respectively, which are attached to cross braces 48 and 49, respectively, of the machine framework. The upper end of shaft 31 carries a gear 14' which meshes with a gear 14 on shaft 7. Attached to the lower end of shaft 31 is a worm wheel 44 which meshes with a gear 45 attached to the lower horizontal shaft 42. The upper horizontal shaft 7 has a crank shown clearly in Figures 6 and 6ª which is encircled by the box 50 of the connecting rod 51 which is suitably connected with the rocker-arm 52 which also is more fully shown in Figures 6 and 6ª. The vertical shaft 31 has a plurality of cranks, arranged preferably at equidistant intervals, the angular positions of the adjacent cranks being preferably 180 degrees apart. These cranks are encircled by the boxes 53, 54, 55, 56, 57, 58, 59 and 60, which are connected respectively to the frames designated 23 to 30, inclusive.

The mode of connecting the various screen-frames with the crank-shafts is shown in Figure 6 which is part of the cross-section $aa'$ of Figure 2, and on Figure 6ª which is a partial plan view of the machine. In Figure 6 the upper shaft has a crank 86 to which the connecting rod 51 is rotatably fastened by means of the box bearing 50. The connecting rod 51 is also movably fastened to the rocker-arm 52 which in turn is connected with the members 88 and 88' attached to the upper and lower inclined frames 3 and 4, respectively. The rocker-arm 52 is pivoted upon the shaft 79. As the crank upon the upper horizontal shaft rotates, the connecting rod imparts an oscillatory motion to the rocker-arm 52 which in turn causes the frames 3 and 4 to move to and fro in relatively opposite directions.

The cranks of the vertical shaft 31, which likewise impart a reciprocating motion to each of the horizontal frames, are rotatably connected to the connecting rods 80, 81 and 82 shown in Figure 6 by means of box bearings 53, 54 and 60. These rods are connected movably with members 83, 84 and 85 rigidly fastened to one end of the frames 23, 24 and 30. Only three frames and their associated connections are shown but it is to be understood that each horizontal frame has a similar crank and connecting means individual to it. It will be seen that the adjacent frames 23 and 24 occupy relatively different positions due to the fact that the angular positions of adjacent cranks of the shaft 31 are 180 degrees apart. The preferable length of travel of the frames is about ¾ inch.

Figure 6ª shows in a plan view, the crank 86 to which is connected the connecting rod 51 by means of the bearing 50. One end of the rod 51 is bifurcated and adapted to be movably connected with the prong of the rocker-arm 52. The upper and lower ends of the said rocker-arm may also be bifurcated so as to receive and form a movable connection with the tongue of the members 88 and 88' rigidly fastened to the inclined frames 3 and 4.

Figures 3 and 3ª show a plan and an end view of a screen frame of the horizontal type which differs from the inclined type only by the extent of the opening at one end. These may be made of angle iron of suitable dimensions, the principal requirement being that they must be of sufficient strength and ruggedness to withstand the effect of rapid reciprocating motion. Rigidly attached to one end of a horizontal frame 61 is a member 83 which is connected by a connecting rod with the crank-shaft 31. The other end of the frame has an opening 62 therein, and to prevent the spreading of its two sides, a curved strap 63 is fastened to the undersurface of the end of the frame. This opening 62 and the curved strap 63 serve as a hand hole by means of which the operator of the machine may readily grasp the end of a screen and by lifting it slightly remove it from its frame. The inclined frames have a wider end-opening than the horizontal frames, as shown by 3 and 4 in Figure 1, so as to provide the maximum clearance practicable for the passage of the material which is intended to be dropped from the inclined screen to the trough.

The screen which is designed to fit within the frame is shown in detail in Figures 7, 7ª and 7ᵇ. This screen comprises a plurality of saw toothed members, arranged in latticed formation, those extending in one direction being as shown in Figure 7ª and those in the other direction as shown in Figure 7ᵇ. The member 64 has a plurality of slots 66 extending upward from the bottom of the member; and member 65 has similarly a plurality of slots 67 extending downward from the roughened edge of the members. These slotted members are designed to fit into each other in the manner shown in Figure 7, and the entire group when assembled may be held rigidly by means of a continuous metal binder 68 as set into notches 69 in the ends of the members or by equivalent means. It is desirable that the consecutive teeth of each member be set to the right and left, respectively, in order to improve the chances of entangling the silk with the screen during its passage therethrough. For the cleaning of corn it has been found desirable to make the inclined screens with one inch meshes and the horizontal screens with three-eighth inch meshes, but, of course, these dimensions may be varied to suit the requirements of particular cases. We desire to make clear that our invention is not limited to the specific saw toothed structure, shown in Figure 7, but it includes the use of barbed and otherwise roughened screens for the removal of silk and similar material from corn, or for analogous purposes.

Figures 4 and 5 represent respectively a cross-section of the mixing receptacle, and the shaft thereof. In Figure 4, 32 represents a hopper which is of such proportions as to ensure the collection of the corn that falls from the lowest screen 22. The bottom of the hopper has sufficient slope to cause the collected mass to slide readily into a smaller cylindrical reservoir from which it will flow through the supply pipes 70 to the various cooking machines. The bottom 72 of the cylinder 74 may be integral therewith or may be attached by a threaded connection or equivalent means. Centrally through the bottom is a hole 76 which has approximately the diameter of the lower part 77 of shaft 36. Over the upper part of the bowl 38 is a cover 71 which has a hollow nipple which screws into the lower part of the reservoir 74. The lower part 77 of shaft 36 extends into the bowl 38 through the central orifice and the space 73 between the nipple and the part 72 is filled with packing material to prevent the escape of steam therethrough. A drip valve 75 is provided to drain the bowl. The arms 37 of the shaft 36 may be of any suitable length, and though only four are shown, a greater or less number may be employed. The upper end of shaft 36 is closed to prevent the egress of steam therethrough and constitutes the upper journal which cooperates with a bearing surface attached to a cross brace of the machine framework. Attached to the shaft is a worm wheel 40 which meshes with a worm attached to the lower horizontal drive shaft. Above the worm wheel 40 and its cooperating gear may be placed a shield adapted to protect the said gearing from being clogged by diverting the corn that falls from the screen directly above the said gearing.

Having in mind the foregoing description of the various parts of the machine and the function performed by each part, the invention will be clear from the following description of its mode of operation.

The green corn, after being husked and removed from the cobs, is conveyed to a point just above the surface and near the extreme top of the uppermost inclined screen 1 and is discharged thereon. The means for delivering the green corn to this machine is not shown since it forms no part of this invention. The corn which is discharged upon the upper screen contains not only relatively large quantities of silk but also coarser material such as bits of the cobs, husks, etc., the prompt removal of which is desirable. Since the meshes of the inclined screens are relatively large the corn and much of the silk will pass therethrough but the larger pieces of objectionable matter will be screened from the mass and will be discharged into the trough and conveyed therefrom by means of the worm. The corn and the finer undesirable matter will pass from the lower inclined screen to the upper horizontal screen and then, in consequence of the rapid reciprocating motion of the screens, it will continue to fall through a plurality of horizontal screens until it reaches the hopper 32 at the base of the machine. Due to the roughened, barbed character of the screen surfaces, the silk will, when dropped thereon, become entangled and be firmly held. The kernels of corn, however, will drop readily through the meshes of the screens and after passing through the lower screen 22 will be collected in the hopper 32.

In order to prevent the massing of the cleaned corn in the hopper, and also in order to prepare it for the subsequent operation of cooking, it is agitated by the rotation of the arms 37 attached to the central shaft 36 of the mixing hopper and it is put in the proper condition for subsequent working by the infusion of steam discharged from perforations in the said arms. The mass of corn which is collected in this hopper may be drawn off from time to time as needed through a plurality of outlets 70, each of which is connected to a cooking machine. The amount of steam discharged by the arms 37 into the accumulated mass of corn may be controlled by the valve 87 which is connected with the main steam supply pipe 39. A thermometer 90 or other temperature indicating means is connected with the hopper in order to ensure that the mass of corn is kept at proper temperature.

If in the process of removing the silk and other objectionable foreign material from the corn that is delivered to the machine, any of the screens should become clogged so as to prevent or partly retard the passage of the corn therethrough, the clogged screen may be readily removed from its frame by the operator without stopping the operation of the machine and may in like manner be restored thereto. By eliminating this source of delay, which is present in the corn silking machines heretofore used, the efficiency of operation is greatly increased.

Although this invention has been described in connection with its use for removing silk and other objectionable matter from green corn it is to be understood that the invention is not thus limited but may be used wherever it is desirable in the canning art to screen the material and to thoroughly mix such material prior to the subsequent operations of preserving it. Furthermore, although this invention has been shown in a certain specific form, it is to be understood that it is capable of embodiment in other and different forms without departing from the spirit and scope of the appended claims.

What is claimed is:

1. In a sifting machine, the combination with a group of inclined sieves of a group of horizontal sieves, driving means to impart rapid reciprocating motion to both groups of sieves, the direction of motion of adjacent sieves of each group being relatively opposite in order to minimize vibration, and a hopper located below said sieves having mixing means operatively connected with said driving means to render substantially homogenous the contents of the said hopper.

2. In a sifting machine, the combination of two groups of sieves inclined relatively to each other, driving means to impart rapid reciprocating motion to each group of sieves, the direction of motion of adjacent sieves of each group being relatively opposite in order to minimize vibration, means to collect the screened material, and mixing means operatively connected with said driving means to render substantially homogenous the material thus collected.

3. In a sifting machine, the combination of a plurality of sieves movably supported in a vertical framework, driving means to impart rapid reciprocating motion to each of said sieves the direction of motion of adjacent sieves being relatively opposite, means to collect the screened material and mixing means operatively connected with said driving means to render substantially homogeneous the collected material.

4. In a sifting machine, the combination of a group of inclined sieves, a group of horizontal sieves, both groups arranged in a vertical framework, driving means associated therewith to impart rapid reciprocating motion to each sieve of said groups, the direction of travel of adjacent sieves being relatively opposite means associated with said group of inclined sieves to collect and convey therefrom refuse material prevented from passing through said sieves, and means to collect the screened material falling from the lowest sieve of said horizontal group and to mix the said material.

5. In a sifting machine, the combination of a screen-frame having one end partly open to permit the passage of a hand therethrough but having the sides of said opening linked to avoid the spreading of the said frame and a screen adapted to fit securely within said frame but capable of being readily removed therefrom.

6. In a sifting machine, the combination with a framework of a plurality of inclined frames having screens inserted therein but readily removable therefrom, the lower end of said frames being opened widely to permit refuse material to readily fall from said screens, means to collect said material and to convey it from said machine, a plurality of horizontal frames arranged below said group of inclined frames having screens inserted therein but readily removable therefrom arranged symmetrically within said framework, driving means to impart reciprocating motion to said screens, and means to collect said screened material, means to agitate said screened material.

7. In a green corn preparing machine, the combination with a plurality of slideable sieves arranged in a vertical framework of means to impart rapid reciprocating motion in relatively opposite directions to the adjacent sieves, a hopper centrally located beneath the group of screens and having a rotatable spindle with a plurality of perforated arms, and means operatively connecting said spindle with the said sieve driving means.

8. In a green corn preparing machine, the combination with a group of inclined movable sieves arranged in a vertical framework and having relatively coarse mesh, a conveyor to remove the refuse material falling from the said sieves, a second group of sieves arranged below the said inclined group adapted to further screen the material falling through the said inclined group of sieves, a hopper centrally located beneath the said screens, a rotatable spindle with a plurality of perforated arms, connected with said hopper, means to operatively connect the said spindle with the driving means of the said groups of sieves, and a source of vapor connected with the said spindle whereby the collected material may be agitated and infused.

In testimony whereof, we have signed our names to this specification this 31st day of January, 1920.

LUCIUS A. HALLER.
IVEN J. VAN FOSSEN.